United States Patent
Roberts

(10) Patent No.: US 7,213,712 B2
(45) Date of Patent: May 8, 2007

(54) SYSTEM FOR SETTLING SOLIDS OR OTHER IMPURITIES FROM WATER OR WASTEWATER AND ASSOCIATED METHODS

(75) Inventor: R. Lee Roberts, Chadds Ford, PA (US)

(73) Assignee: RG Delaware, Inc., Wilmington, DE (US)

( * ) Notice: Subject to any disclaimer, the term of this patent is extended or adjusted under 35 U.S.C. 154(b) by 0 days.

(21) Appl. No.: 11/049,927

(22) Filed: Feb. 4, 2005

(65) Prior Publication Data

US 2006/0175251 A1 Aug. 10, 2006

(51) Int. Cl.
*B01D 21/24* (2006.01)

(52) U.S. Cl. .................. 210/519; 210/521; 210/522; 210/532.1

(58) Field of Classification Search .......... 210/519, 210/521, 522, 523, 532.1, 540
See application file for complete search history.

(56) References Cited

U.S. PATENT DOCUMENTS

| 3,491,892 | A | * | 1/1970 | McCann | 210/521 |
| 3,886,064 | A | * | 5/1975 | Kosonen | 210/522 |
| 3,898,164 | A | * | 8/1975 | Hsiung | 210/521 |
| 4,076,615 | A | | 2/1978 | Olesen et al. | |
| 4,089,782 | A | * | 5/1978 | Huebner | 210/522 |
| 4,184,954 | A | | 1/1980 | Peterson | |
| 4,295,244 | A | | 10/1981 | Herpers et al. | |
| 4,303,517 | A | | 12/1981 | Love et al. | |
| 4,351,733 | A | * | 9/1982 | Salzer et al. | 210/521 |
| 4,388,195 | A | | 6/1983 | von Hagel et al. | |
| 4,514,303 | A | * | 4/1985 | Moore | 210/519 |
| 4,793,926 | A | * | 12/1988 | Vion | 210/521 |
| 4,957,628 | A | * | 9/1990 | Schulz | 210/519 |
| 5,397,472 | A | * | 3/1995 | Bouchard | 210/532.1 |
| 5,536,409 | A | * | 7/1996 | Dunkers | 210/519 |
| 6,817,476 | B2 | | 11/2004 | Donnick et al. | |
| 2004/0031750 | A1 | * | 2/2004 | Larsson | 210/521 |

OTHER PUBLICATIONS

Excerpt from Parkson Corporation's Web page.
"The GEWE System from Purac Engineering . . . ".
Excerpt from Enviropax's web page.
ST Product Sheet, four pages.

* cited by examiner

*Primary Examiner*—Christopher Upton
(74) *Attorney, Agent, or Firm*—Merek, Blackmon & Voorhees, LLC

(57) ABSTRACT

A system for settling solids or other impurities from water or wastewater. The system includes a containment vessel for containing fluid. The containment vessel has an inlet for receiving an influent and an outlet through which an effluent is discharged. At least a first group of tube settlers is disposed in the containment vessel. The first group of tube settlers has a top, a bottom and a plurality of tubes for receiving influent and discharging effluent. A distribution channel is provided for distributing influent evenly through the first group of tube settlers to enhance the settling of solids and other impurities from water or wastewater.

21 Claims, 4 Drawing Sheets

SYSTEM FOR SETTLING SOLIDS OR OTHER IMPURITIES FROM WATER OR WASTEWATER AND ASSOCIATED METHODS

FIELD OF THE INVENTION

The present invention is directed to a system for settling solids or other impurities from water and/or wastewater that includes tube settlers as a component of the system. In other words, tube settlers are an essential component of the present invention.

BACKGROUND OF THE INVENTION

It has previously been known to remove impurities from water and/or wastewater with systems utilizing tube settlers. Tube settlers are most commonly used in bundle configurations. Tube settlers typically measure approximately two feet wide and thirty inches high. Tube settlers are typically oriented on a sixty degree slope to provide the tubes with a developed length of approximately three feet. The length of the bundles of tube settlers range from approximately four feet to fifteen feet. Runs longer than fifteen feet are achieved by orienting multiple bundles in an end-to-end manner. The end-to-end configuration of multiple bundles of tube settlers can provide the tube settler system with an overall length in excess of one hundred feet. Tube settlers are typically formed from PVC or ABS. Tube settlers may be employed in the construction of new systems or in the rehabilitation of existing water and/or wastewater treatment plants.

One of the major deficiencies in previously known tube settlers has been the occurrence of short-circuiting, i.e., the influent flow and effluent flow is not uniformly distributed along the length of the tube settler. Maldistribution results in localized high velocity fluid flow through the tube settlers resulting in significantly reduced settling efficiency. This highly undesirable condition is aggravated when the tubes become clogged with floc resulting in even greater maldistribution of fluid through the tube settlers.

It has previously been proposed to use large distributors below the tube settlers in an effort to avoid maldistribution of fluid through the tube settlers. These distributors are commonly made using large diameter pipes having drilled orifices. These large distributors are expensive. Further, these large distributors occupy considerable space below the tube settlers decreasing the waste collection volume of the vessel in which the tube settlers are located. Similarly, previously developed tube settler systems have employed large collectors to collect the effluent exiting the tube settlers. These effluent collectors include submerged orifices, V-notched weirs or other forms of fluid flow control in an effort to provide even flow above the tube settlers.

OBJECTS AND SUMMARY OF THE INVENTION

An object of the preferred embodiment of the present invention is to provide a novel and unobvious system for settling solids or other impurities from water or wastewater.

Another object of a preferred embodiment of the present invention is to provide a system for settling solids or other impurities from water or wastewater that overcomes one or more disadvantages of previously known settling systems.

A further object of a preferred embodiment of the present invention is to provide a system for settling solids or other impurities from water or wastewater that achieves superior distribution of fluid flow through one or more bundles of tube settlers.

Yet still another object of the present invention is to provide a system for settling solids or other impurities from water or wastewater that eliminates the need for large and/or costly distribution devices below one or more bundles of tube settlers.

A still further object of the present invention is to provide a system for settling solids or other impurities from water or wastewater that eliminates the need for large and/or costly collection devices above one or more bundles of tube settlers It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a system for settling solids or other impurities from water or wastewater. The system includes a containment vessel for containing fluid. The containment vessel has an inlet for receiving an influent and an outlet through which an effluent is discharged. At least a first group of tube settlers are disposed in the containment vessel. The first group of tube settlers has a top, a bottom, a first end and a second end. The first group of tube settlers further has a plurality of tubes for receiving influent and discharging effluent. The system further includes a distribution member for distributing influent evenly through the first group of tube settlers. At least a first portion of the distribution member is disposed between the top of the first group of tube settlers and the bottom of the first group of tube settlers.

Another preferred embodiment of the present invention is directed to a system for settling solids or other impurities from water or wastewater. The system includes a containment vessel for containing fluid. The containment vessel has an inlet for receiving an influent and an outlet through which an effluent is discharged. At least first and second groups of tube settlers are disposed in the containment vessel. The first and second groups of tube settlers each have a top and a bottom. Each of the first and second groups of tube settlers further have a plurality of tubes for receiving influent and discharging effluent. A distribution channel is provided for distributing influent evenly through the first and second groups of tube settlers. The distribution channel has a first sidewall, a second sidewall and a bottom. The distribution channel further has a plurality of orifices through which the influent flows. The distribution channel is disposed relative to the first group of tube settlers such that at least a portion of the distribution channel extends between the top of the first group of tube settlers and the bottom of the first group of tube settlers.

A further embodiment of the present invention is directed to a system for settling solids or other impurities from water or wastewater. The system includes a containment vessel for containing fluid. The containment vessel has an inlet for receiving an influent and an outlet through which an effluent is discharged. At least first and second groups of tube settlers are disposed in the containment vessel. The first and second groups of tube settlers each have a top and a bottom. Each of the first and second groups of tube settlers further have a plurality of tubes for receiving influent and discharging effluent. A distribution member is provided for distributing influent evenly through the first and second groups of tube settlers. A collection member is provided for collecting effluent from the first and second groups of tube settlers. The distribution member and the collection member share a common wall.

Still a further preferred embodiment of the present invention is directed a system for settling solids or other impurities from water or wastewater. The system includes a containment vessel for containing fluid. The containment vessel has an inlet for receiving an influent and an outlet through which an effluent is discharged. At least first and second groups of tube settlers are disposed in the containment vessel. The first and second groups of tube settlers each have a top and a bottom. Each of the first and second groups of tube settlers further have a plurality of tubes for receiving influent and discharging effluent. A distribution member is provided for distributing influent evenly through the first and second groups of tube settlers. The distribution member has a plurality of orifices posited below the bottom of the first group of tube settlers and the bottom of the second group of tube settlers. At least a portion of the distribution member is one piece with at least a portion of the first group of tube settlers and at least a portion of the distribution member is one piece with at least a portion of the second group of tube settlers.

BRIEF DESCRIPTION OF THE DRAWINGS

FIG. 3 is an enlarged plan view of a portion of the tube settlers illustrated in FIG. 3 by dashed lines referenced as 3—3.

DETAILED DESCRIPTION OF THE PREFERRED EMBODIMENT OF THE INVENTION

The most preferred forms of the invention will now be described with reference to FIGS. 1–7. The appended claims are not limited to the most preferred forms and no term used herein is to be given a meaning other than its ordinary meaning unless accompanied by a statement that the term "as used herein is defined as follows".

Figure 1:
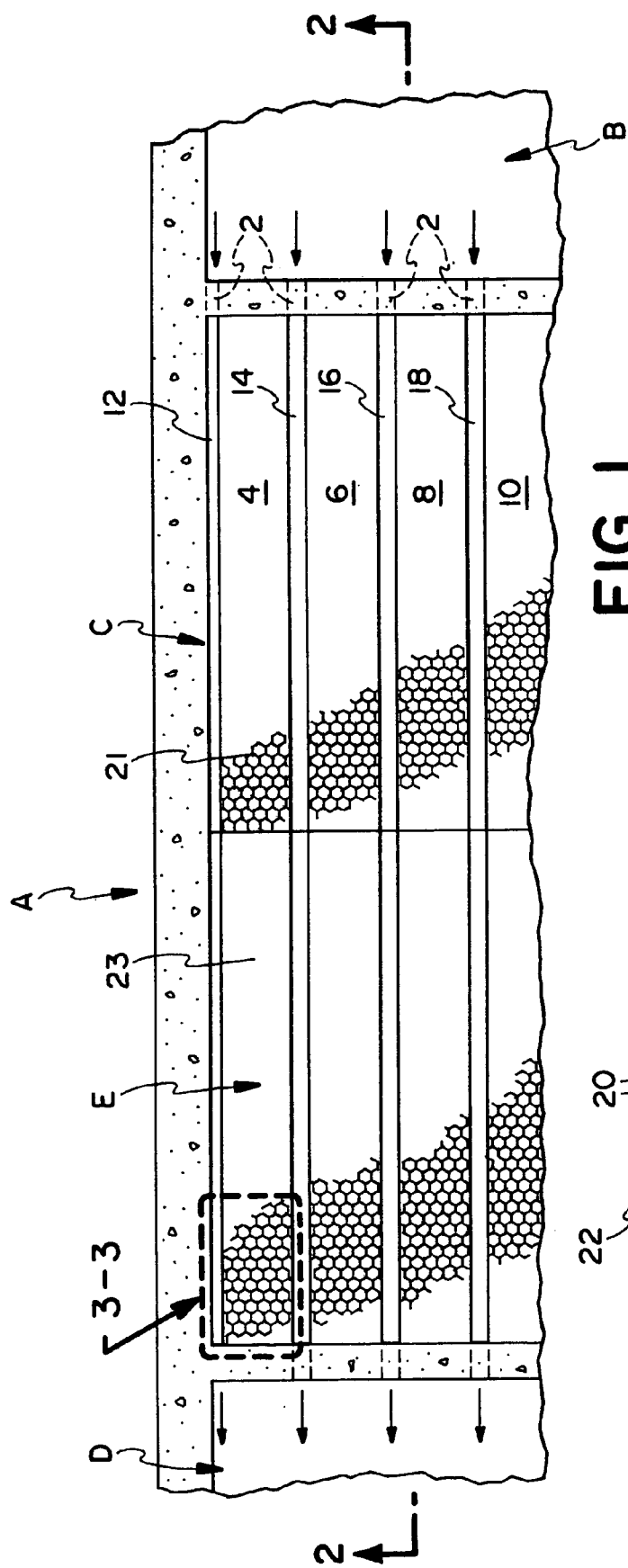
FIG. 1 is a fragmentary plan view of a system formed in accordance with a preferred embodiment of the present invention.
Figure 2:
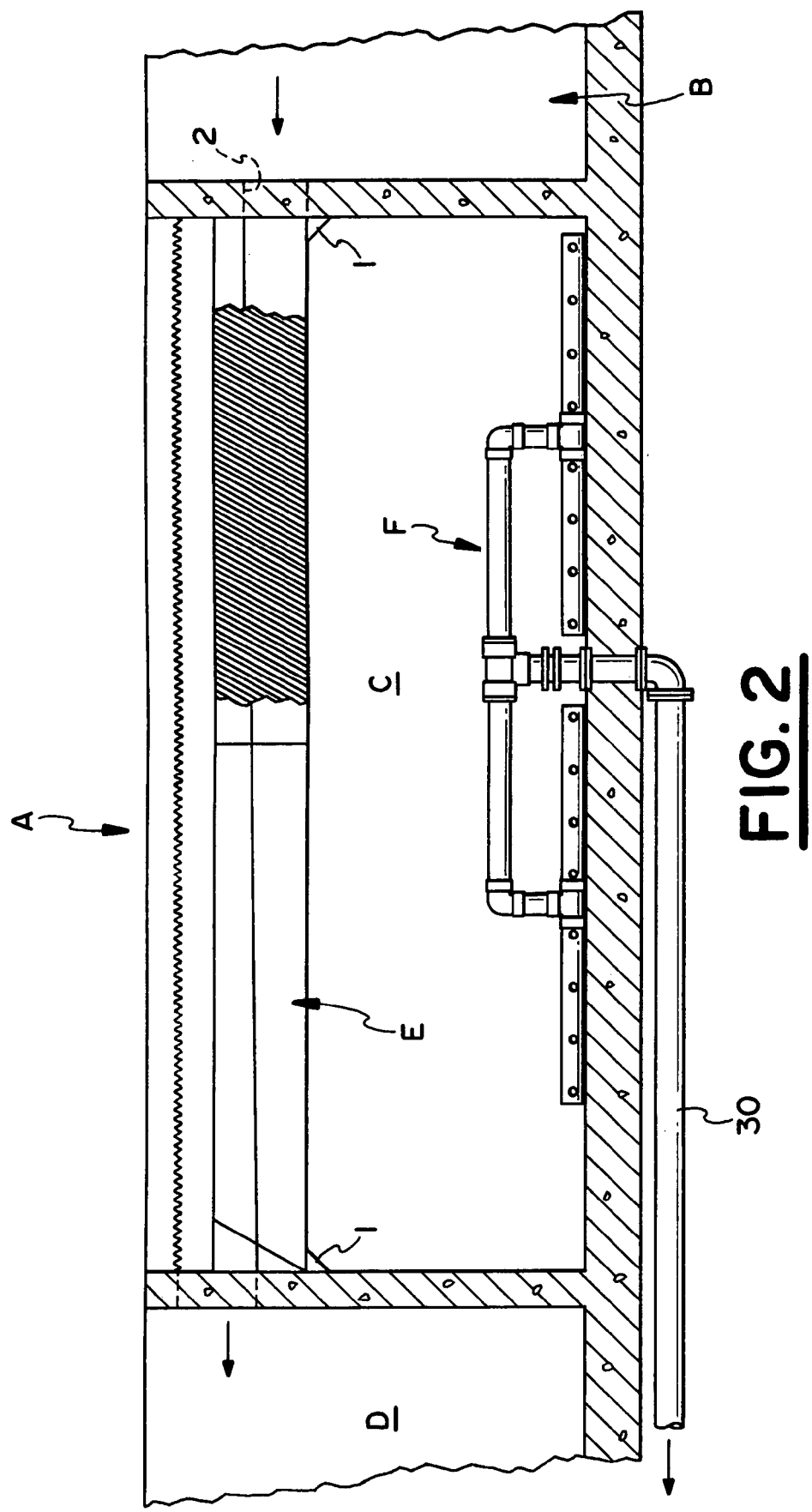
FIG. 2 is a fragmentary cross-sectional view taken along the lines 2—2 in FIG. 1.

FIGS. 1 Through 3

Referring to FIGS. 1 to 4, a portion of a system A for settling solids or other impurities from water or wastewater is illustrated in one of many possible configurations. The omitted details of system A and their interrelationship with the illustrated portions will be readily appreciated by one of ordinary skill in the art.

System A includes a flocculator B, containment and settling vessel or basin C and an effluent discharge vessel or basin D. The outer walls of the flocculator B, vessel C and vessel D may be formed of concrete or any other suitable material.

Any conventional flocculator can be used as the flocculator B. Since the construction and operation of flocculators are well known to those of ordinary skill in the art, flocculator B will not be described in detail. However, it is noted that the process of flocculation occurring in flocculator B results in the agglomeration of impurities in the influent allowing the impurities to be readily settled out as the fluid passes through the containment and settling vessel C. As used herein influent is defined as fluid that has not passed through the tube settlers. Effluent as used herein is defined as fluid that has passed through the tube settlers. Influent from the flocculator B enters the containment and settling vessel C through inlets 2 shown in FIGS. 1 and 2.

The containment and settling vessel C includes a tube settler module E and a sludge collection system F. Support members 1 support the tuber settler module E above the sludge collection system F. The sludge collection system F may be of any conventional construction. However, it is preferred that the SPYDER® sludge collection system be used to remove the sludge from vessel C. The SPYDER® sludge collection system is disclosed in U.S. Pat. Nos. 6,045,709 and 6,354,328 which are incorporated herein by reference in their entirety.

The tube settler module E includes one or more tube settler groups. While four tube settler groups 4, 6, 8 and 10 are shown in FIG. 1, it will be readily appreciated that the number of groups may be varied as desired. The tube settler module E further includes one or more influent channels. While four influent channels 12, 14, 16 and 18 are shown in FIG. 1, it will be readily appreciated that the number of influent channels may be varied as desired.

Each group of tube settlers includes at least one bundle of tubes. Preferably, the tube bundles have a honeycomb type construction. However, it will be readily appreciated that the configuration of the tube bundles may vary. As seen in FIG. 1, each tube settler group includes two tube bundles 21 and 23 oriented in an end-to-end manner. Referring to FIG. 3, each tube bundle includes a plurality of tubes 20. Each of the tubes 20 is preferably oriented on a sixty degree slope.

Each tube bundle also includes sidewalls. For example, the tube bundle illustrated in FIG. 3 includes sidewalls 22 and 24. Preferably, the sidewalls of the tube bundles form the walls of the corresponding influent channels, i.e., the sidewalls of the tube bundles and the sidewalls of the corresponding influent channels are formed from one-piece.

Figure 4:
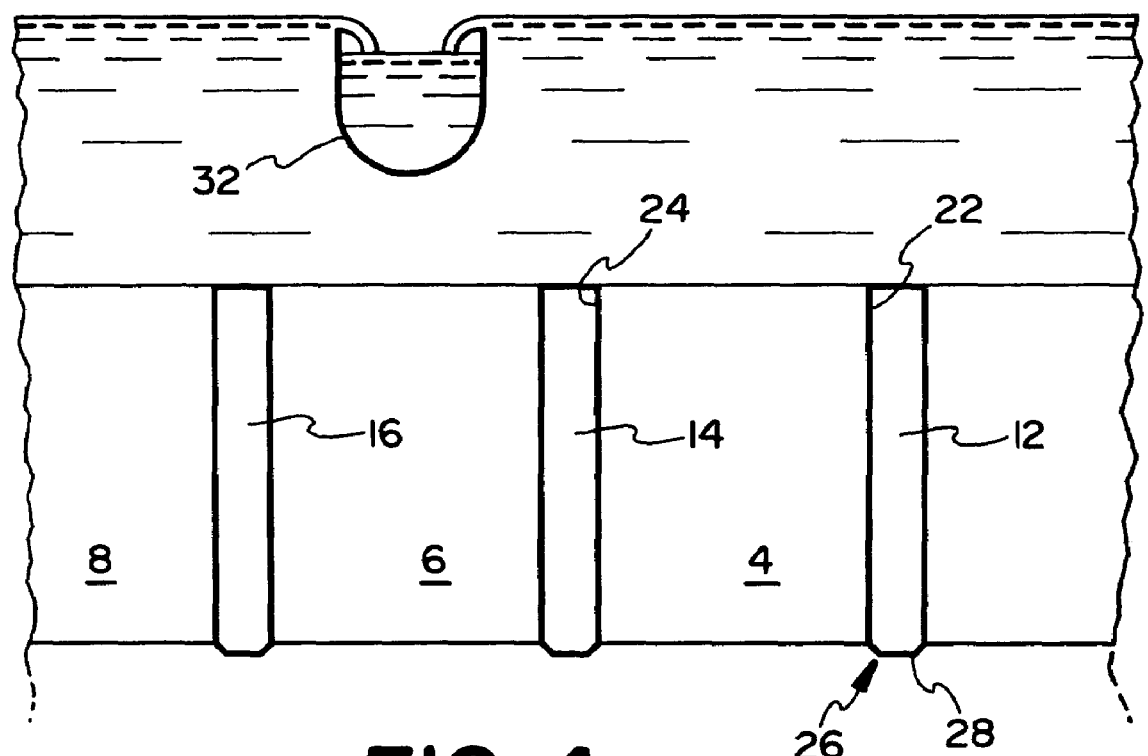
FIG. 4 is a fragmentary sectional view of the embodiment illustrated in FIG. 1 with various features omitted.

The influent channels 12, 14, 16 and 18 run the length of the corresponding tube settler groups 4, 6, 8 and 10. Referring to FIG. 4, a plurality of orifices 26 are formed in the lower section 28 of each of the influent channels 12, 14, 16 and 18. The orifices 26 are positioned below the lowermost portion of the corresponding tube settlers groups. The orifices 26 are further formed along the length of the influent channel. In this manner, the influent is directed below the tube settler groups along the entire length of the corresponding tube settler group. The lower section 28 of the influent channels may be a separate piece from the sidewalls of the influent channels. In this instance, the lower section 28 may be secured in a fluid tight manner to the sidewalls of the influent channel using any conventional means. Alternatively, the lower section may be formed as one-piece with the sidewalls of the influent channels.

As seen in FIG. 4, a major portion of the influent channels extends between the top of the tube settler groups and the bottom of the tube settler group. However, it is essential that a minor portion of the influent channels extend below the bottom of the corresponding tube settler groups to ensure the influent is directed below the bottom of the corresponding tube settler group.

As the fluid travels below the groups of tube settlers upwardly through the individual tubes, solids and other impurities in the fluid settle to the bottom of the vessel C where they are removed by the sludge collection system F and transported to a desired location via piping 30.

The containment and settling vessel C also includes a collection launderer 32 as seen in FIG. 4 for collecting the effluent discharged from the tube settler groups.

Figure 5:
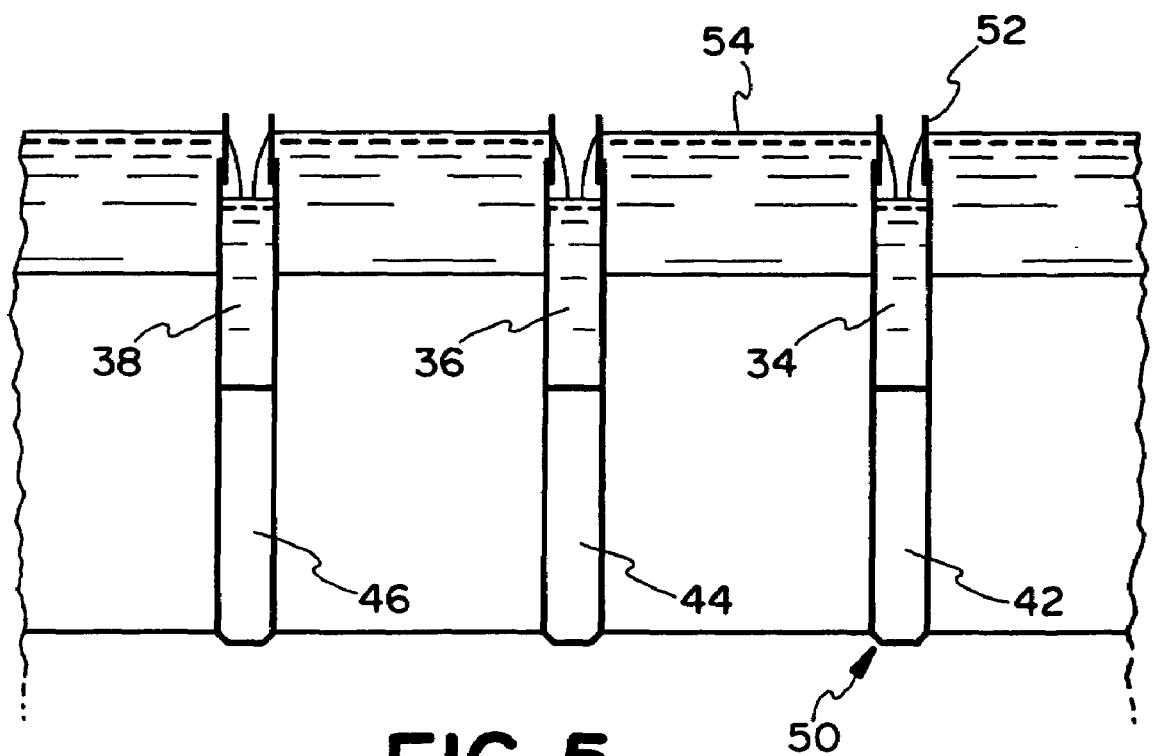
FIG. 5 is a fragmentary sectional view of a second preferred embodiment of the present invention with various features omitted.
Figure 6:
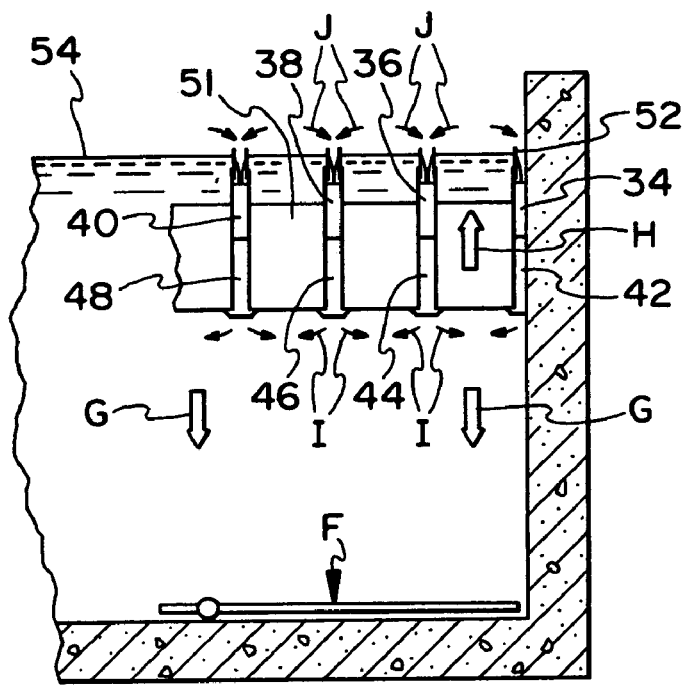
FIG. 6 is a fragmentary sectional view of the embodiment illustrated in FIG. 5 showing the fluid flow path as well as additional features not shown in FIG. 5.

FIGS. 5 and 6

Another preferred embodiment will now be described in connection with FIGS. 5 and 6. In this embodiment, the collection launderer 32 has been replaced with effluent collection channels 34, 36, 38 and 40 mounted directly above influent distribution channels 42, 44, 46 and 48. The effluent channels extend above the top 51 of the corresponding group of tube settlers. Preferably, the sidewalls of the effluent collection channels 34, 36, 38 and 40 are formed as one-piece with the corresponding sidewalls of the influent distribution channels 42, 44, 46 and 48. Orifices 50 are formed in the influent distribution channels below the bottom of the tube settler groups to ensure that the fluid is directed below the lowermost portion of the tube settler groups. Preferably, the effluent collection channels 42, 44, 46 and 48 are provided with v-notch flow control weirs 52. In this manner, the flow of the effluent 54 into the collection channels can be controlled. However, it will be readily appreciated that any suitable flow control device can be used.

It is noted that the sludge collection system F of this second preferred embodiment is the same as the first preferred embodiment depicted in FIGS. 1 through 4. Accordingly, it has the same reference character.

Referring to FIG. 6, arrow G represents the direction that solids and other impurities travel. Arrow H represents the direction that fluid flows through the tubes of the tube settler groups. Arrows I represent the directions that fluid flows out of the influent distribution channels.

FIG. 7

Figure 7:
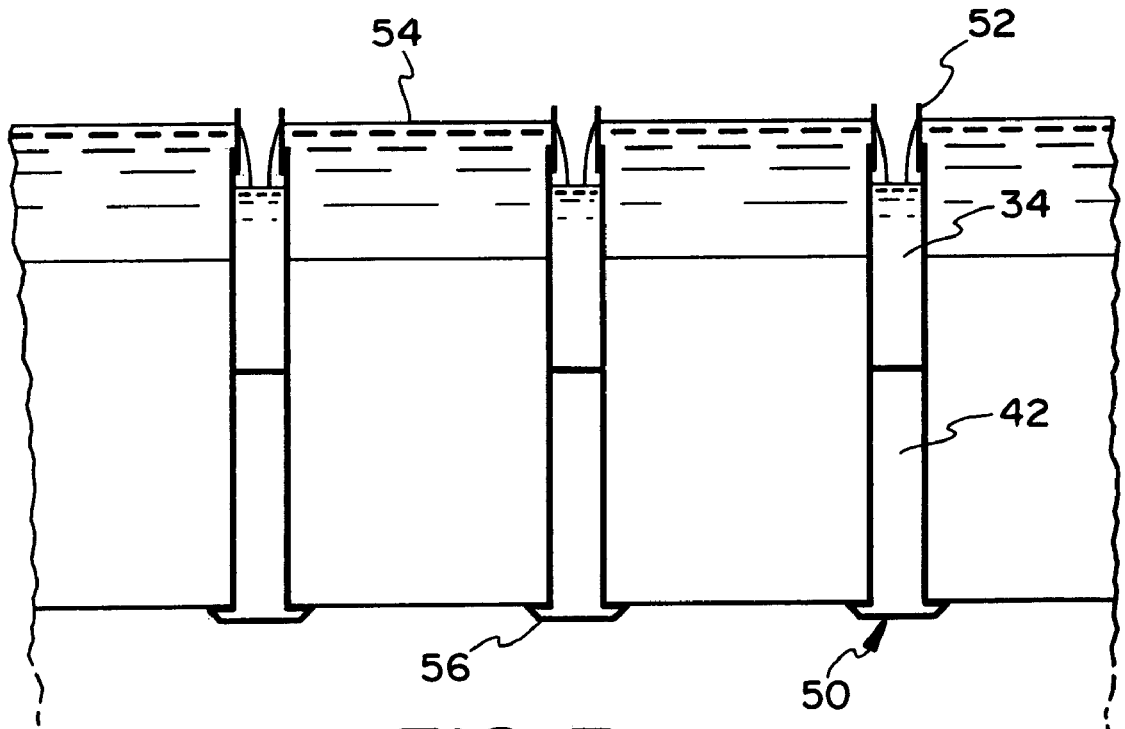
FIG. 7 is a fragmentary sectional view of a third preferred embodiment of the present invention with various features omitted.

A further preferred embodiment will now be described in connection with FIG. 7. This embodiment is the same as the embodiment depicted in FIGS. 5 and 6 with the sole exception noted below. Accordingly, like elements are given the same reference numerals. The influent channels in this embodiment differ from early embodiments in that support members 56 extending outwardly from each side of the influent channels to support the tube settler groups. These support members eliminate the need for intermediate supports along the length of the tube settler groups.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment.

I claim:

1. A system for settling solids or other impurities from water or wastewater, said system including:
 (a) a containment vessel for containing fluid, said containment vessel having an inlet for receiving an influent and an outlet through which an effluent is discharged;
 (b) at least a first group of tube settlers disposed in said containment vessel, said first group of tube settlers having a top, a bottom, a first end and a second end, said first group of tube settlers further having a plurality of tubes for receiving influent and discharging effluent; and,
 (c) a distribution member for distributing influent evenly through said first group of tube settlers, at least a first portion of said distribution member being disposed between said top of said first group of tube settlers and said bottom of said first group of tube settlers, said distribution member including a plurality of orifices for directing influent downwardly and below from said first group of tube settlers.

2. A system as set forth in claim 1, wherein:
 (a) said distribution member is a distribution channel having a first sidewall, a second sidewall, a bottom and a plurality of orifices through which the influent flows.

3. A system as set forth in claim 2, wherein:
 (a) said plurality of orifices are disposed below said bottom of said first group of tube settlers.

4. A system as set forth in claim 1, wherein:
 (a) at least a portion of said inlet of said containment vessel extends above said bottom of said first group of tube settlers.

5. A system as set forth in claim 4, wherein:
 (a) said distribution member is formed from a non-metallic material.

6. A system as set forth in claim 1, further including:
 (a) a sludge collection system positioned in said containment vessel, said first group of tube settlers being positioned above said sludge collection system; and,
 (b) a flocculator upstream of said containment vessel.

7. A system as set forth in claim 1, further including:
 (a) a collection member, said collection member and said distribution member having a common wall.

8. A system as set forth in claim 7, further including:
 (a) a second group of tube settlers disposed in said containment vessel, said second group of tube settlers having a top, a bottom, a first end and a second end, said second group of tube settlers further having a plurality of tubes for receiving influent and discharging effluent; and,
 (b) at least a portion of said collection member and at least a portion of said distribution member extend between said top of said first group of tube settlers and said bottom of said first group of tube settlers.

9. A system as set forth in claim 8, wherein:
 (a) at least a major portion of said collection member extends between said top of said first group of tube settlers and said bottom of said first group of tube settlers.

10. A system for settling solids or other impurities from water or wastewater, said system including:
 (a) a containment vessel for containing fluid, said containment vessel having an inlet for receiving an influent and an outlet through which an effluent is discharged;
 (b) at least first and second groups of tube settlers disposed in said containment vessel, said first and second groups of tube settlers each having a top and a bottom, each of said first and second groups of tube settlers further having a plurality of tubes for receiving influent and discharging effluent; and, (c) a distribution channel for distributing influent evenly through said first and second groups of tube settlers, said distribution channel having a first sidewall, a second sidewall and a bottom, said distribution channel further having a plurality of orifices formed in said bottom of said distribution channel through which the influent flows downward and below said first and second group of tube settlers, said distribution channel being disposed relative to said first group of tube settlers such that at least a portion of said distribution channel extends between said top of said first group of tube settlers and said bottom of said first group of tube settlers.

11. A system as set forth in claim 10, wherein:
(a) said top of said first group of tube settlers is disposed at substantially the same height as said top of said second group of tube settlers and said bottom of said first group of tube settlers is disposed at substantially the same height as said bottom of said second group of tube settlers.

12. A system as set forth in claim 10, wherein:
(a) said distribution channel includes means for supporting said first and second groups of tube settlers.

13. A system as set forth in claim 10, wherein:
(a) said first group of tube settlers are disposed adjacent said first sidewall of said distribution channel and said second group of tube settlers are disposed adjacent said second sidewall of said distribution channel.

14. A system as set forth in claim 10, wherein:
(a) at least a major portion of said distribution channel extends between said top of said first group of tube settlers and said bottom of said first group of tube settlers.

15. A system for settling solids or other impurities from water or wastewater, said system including:
(a) a containment vessel for containing fluid, said containment vessel having an inlet for receiving an influent and an outlet through which an effluent is discharged;
(b) at least first and second groups of tube settlers disposed in said containment vessel, said first and second groups of tube settlers each having a top and a bottom, each of said first and second groups of tube settlers further having a plurality of tubes for receiving influent and discharging effluent;
(c) a distribution member for distributing influent evenly through said first and second groups of tube settlers, said distribution member having a plurality of orifices for directing influent downwardly and below said first and second group of tube settlers;
(d) a collection member for collecting effluent from said first and second groups of tube settlers; and,
(e) said distribution member and said collection member share a common wall.

16. A system as set forth in claim 15, wherein:
(a) said distribution member is a distribution channel having a first sidewall, a second sidewall, a bottom and a plurality of orifices through which the influent flows.

17. A system as set forth in claim 16, wherein:
(a) said collection member is a collection channel having a first sidewall, a second sidewall, a bottom.

18. A system as set forth in claim 17, wherein:
(a) said first sidewall of said collection channel and said first sidewall of said distribution channel are one piece.

19. A system as set forth in claim 18, wherein:
(a) said second sidewall of said collection channel and said second sidewall of said distribution channel are one piece.

20. A system as set forth in claim 19, wherein:
(a) said collection channel includes a fluid flow control member.

21. A system for settling solids or other impurities from water or wastewater, said system including:
(a) a containment vessel for containing fluid, said containment vessel having an inlet for receiving an influent and an outlet through which an effluent is discharged;
(b) at least first and second groups of tube settlers disposed in said containment vessel, said first and second groups of tube settlers each having a top and a bottom, each of said first and second groups of tube settlers further having a plurality of tubes for receiving influent and discharging effluent; and,
(c) a distribution member for distributing influent evenly through said first and second groups of tube settlers, said distribution member having a plurality of orifices positioned below said bottom of said first group of tube settlers and said bottom of said second group of tube settlers, at least a portion of said distribution member is one piece with at least a portion of said first group of tube settlers and at least a portion of said distribution member is one piece with at least a portion of said second group of tube settlers.

* * * * *